Patented May 13, 1952

2,596,820

UNITED STATES PATENT OFFICE 2,596,820

2,3,5,6,TETRAMETHYL ANILINO ANTHRAQUINONES AND METHOD OF MAKING THE SAME

James Ogilvie, Buffalo, N. Y., assignor to Allied Chemical & Dye Corporation, New York, N. Y., a corporation of New York No Drawing. Application April 13, 1949, Serial No. 87,342

12 Claims. (Cl. 260—374)

This invention relates to novel anthraquinone dyestuffs containing aryl amino groups derived from the hydrocarbon 1,2,4,5-tetramethylbenzene, and to a process for preparing them.

The new dyestuffs of my invention belong to the so-called "milling color" type and produce pure, brilliant blue to blue-green shades upon dyeing.

Anthraquinone dyestuffs have been well-known in the past and have been applicable mainly to dyeing cotton fibers on which they produce brilliant shades of excellent fastness to light and washing. In general, however, they are unsuited to dyeing nitrogen-containing fibers, such as wool, silk, nylon, etc., because of the necessity for using alkaline reducing baths to dissolve the dyestuff. The alkali of these baths tends to be destructive or harmful to wool and other nitrogen-containing fibers.

Attempts in the past to dye such nitrogen-containing fibers from neutral or acid baths have taken many forms, among which are expedients which render the dyestuff water-soluble, as by the introduction of sulfo groups into the dyestuff molecule, and the like.

Dyestuffs of the character referred to above, prepared from sulfonated compounds of the anthraquinone series derived from certain aromatic amines, have been known in the past. However, dyestuffs of this class which dye wool pure blue shades are either deficient in fastness properties or are not suitable for neutral dyeing. Others which are suitable for neutral dyeing and possess the desired fastness properties, especially fastness to washing, yield dyeings which are not pure blue or brilliant in shade. Thus according to British Patent 579,519 the prior art dyestuff 1,4-bis (2', 4', 6'-trimethyl anilino) anthraquinone disulfonate exhibits in a neutral dyebath only about 25% of the affinity to wool that it exhibits in an acid dye-bath of equal initial dyestuff concentration which is completely exhausted.

Similarly, another type of prior art dyestuff, namely 1,4-bis (2', 4', 6'-triethyl anilino) anthraquinone disulfonate exhibits a neutral dyeing affinity to wool of only about 50%.

It is an object of the invention to provide as new compositions of matter novel anthraquinone dyestuffs containing as substituents from one to four 6-amino-1,2,4,5-tetramethylbenzene groups, one or more of which may be further substituted by a sulfo group, and a process for preparing such novel compositions.

It is a further object of the invention to provide brilliant blue, water-soluble sulfonated dyestuffs which dye proteinaceous fibers, such as wool and silk, and other nitrogenous fibers such as nylon, from either an acid or neutral dyebath in strong, bright blue to bluish-green shades, which possess excellent fastness to light, washing and fulling, and a substantially higher neutral affinity to wool than has been obtained in the past.

It is a still further object of this invention to provide dyestuffs of the aforementioned properties, which dye wool from neutral and acid dyebaths without showing undue disparity in shade and strength in the dyeings thus produced.

Another object of the invention is to provide water-insoluble unsulfonated anthraquinone dyestuffs, which are soluble in and suitable for coloring organic solvents of the pyridine and substituted benzene types, and for coloring plastics and lacquers, especially those containing cellulose esters and ethers, such as cellulose acetate.

The objects of the present invention are accomplished according to my invention through the provision of novel anthraquinone dyestuffs of the following general formula:

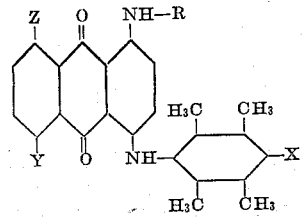

wherein R represents a member selected from the group consisting of hydrogen, alkyl, and the radical

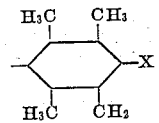

and each X represents a member selected from the group consisting of hydrogen and a sulfo group, and Y and Z each represent a member selected from the group consisting of hydrogen and NHR, wherein R has the significance defined above.

The new dyestuffs of the invention which contain one or more sulfo groups, are soluble in water. They are distinguished by outstanding neutral dyeing affinity to animal fibers such as wool, of the order of 80–85%, combined with an ability to dye such fibers from an acid or neutral dyebath in pure blue to bluish-green shades possessing excellent brilliance and fastness properties. Dyestuffs of the invention, which are devoid of sulfo groups, are insoluble in water, but they are soluble in many organic solvents such as nitrobenzene, monochlorobenzene, dichlorobenzene, pyridine, somewhat soluble in benzene and gasoline, and are practically insoluble in ethyl alcohol. When dissolved in organic solvents, the dyestuffs yield pure blue to bluish-green colorations of good fastness properties. The dyestuffs are also suitable for coloring plastics and lacquers, such as cellulose acetate, and the like.

The term "sulfo group" as used herein is intended to include both the acid group, $SO_3H$, and the alkali metal, e. g. sodium and potassium, and ammonium substituted groups.

The novel dyestuffs of the invention may be prepared by condensing durene, i. e. 1,2,4,5-tetramethylbenzene, through a nuclearly halogenated derivative thereof of the following formula:

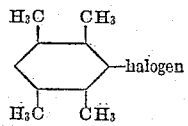

with an anthraquinone compound (including leuco forms thereof) of the general formula:

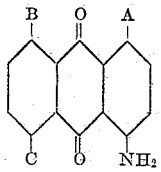

wherein A represents a member of the class consisting of amino and alkylamino, and B and C each stand for a member of the class consisting of hydrogen, amino and an alkylamino radical. The condensation of the halogen-durene and aminoanthraquinone compounds of the above type may be effected by heating the mixture at an elevated temperature, preferably between about 100° C. and about 250° C., in the presence of a liquid organic solvent or diluent, e. g. a halogenated or nitrated aromatic hydrocarbon such as chlorobenzene, ortho-dichlorobenzene, and nitrobenzene, until the reaction is complete, a period of between about five hours and about twenty hours usually being sufficient. The halogen-durene compound is preferably employed in an amount equal to or slightly in excess of one mol for each amino group to be substituted per mol amino-anthraquinone compound. The condensation is preferably carried out in the presence of a catalyst, such as a copper-containing catalyst, for example powdered copper or a copper salt, and an acid binding agent, such as alkali metal and ammonium salts, nitrogen bases, etc., for example ammonium and alkali metal acetates, carbonates and bicarbonates, urea, and the like. Where a leuco anthraquinone compound is employed, the reaction product may be converted to the anthraquinone form in customary manner by treatment with a suitable oxidizing agent, e. g. nitrobenzene, a peroxide, or a perborate. The water-insoluble condensation products thus obtained may be converted into water-soluble sulfonic acids by treatment with a sulfonating agent such as sulfuric acid or oleum of suitable concentration, mixtures of sulfuric acid and oleum, and chlorosulfonic acid, according to methods known in the art.

Among the aminoanthraquinone compounds of the above type which may be reacted with a halogen-durene, such as, for example, 1-bromo-2,3,5,6-tetramethylbenzene, in accordance with the present invention, are included 1,4-diaminoanthraquinone, 1 - methylamino-4-aminoanthraquinone, 1 - isopropylamino-4-amino-anthraquinone, 1-amylamino-4-aminoanthraquinone, 1,4-leuco-diaminoanthraquinone, 1,4,5 - triaminoanthraquinone, 1,4,5,8 - tetraaminoanthraquinone and 1,4-dimethylamino - 5,8 - diaminoanthraquinone and the like.

The halogenated-durene compound (i. e. halogenated 1,2,4,5-tetramethylbenzene) may be prepared by the method described in JACS 55 (1933), pages 1680–1681, with respect to monobromodurene, which consists essentially of brominating a carbon tetrachloride solution of durene.

The following specific examples will further illustrate the invention:

*Example 1*

An agitated mixture of 43 parts of monobromodurene
16 parts of 1,4-diaminoanthraquinone
40 parts of nitrobenzene
14 parts of anhydrous potassium acetate
0.3 part of copper acetate
0.3 part of cuprous chloride is heated to 180° to 190° C. for 15 hours, during which period the reaction mixture gradually assumes a bright blue coloration. The reaction mixture is allowed to cool to 70° to 80° C., and is mixed with 80 parts of denatured ethyl alcohol formula 2B (96% ethyl alcohol denatured with ½ gallon of benzene per 100 gallons of ethyl alcohol. U. S. Treasury Dept. Bur. of Internal Revenue Appendix to Regulations #3—Formulae for completely and specially denatured alcohols 1942 p. 14). The diluted mixture is allowed to cool to 25° C. and filtered, and the filter cake is washed with 40 parts of alcohol 2B. The cake is boiled with 500 parts of about 2% aqueous hydrochloric acid for about ½ hour, then filtered, washed with water and dried. The dry dyestuff base thus obtained is purified by dissolving it in 6 times its weight of hot orthodichlorobenzene, cooling the solution to crystallize the base, filtering, washing the filter cake with a little alcohol 2B, and drying the washed cake.

The condensation product thus obtained has the following formula:

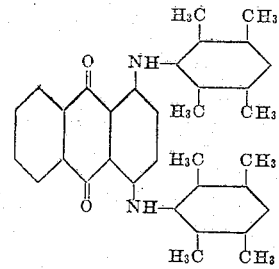

It is practically insoluble in ethyl alcohol, somewhat soluble in gasoline, benzene, and acetone and appreciably soluble in solvents such as pyridine, nitrobenzene and orthodichlorobenzene, yielding pure blue solutions of good fastness to light.

10 parts of the condensation product obtained above are stirred into a mixture of 37 parts of 100% sulfuric acid and 37 parts of 26% oleum at about 20° C. and the resulting sulfonation mixture is agitated at 20° C. to 25° C. for several hours until a sample of the sulfonation mass is completely soluble in hot water. The reaction mixture is then poured into 700 parts of ice cold water containing 35 parts of common salt, and the precipitated dyestuff is separated by filtration and washed acid free with 5% aqueous sodium chloride. The filter cake of dystuff sulfonic acid thus obtained is slurried in water and the slurry is rendered neutral to Brilliant Yellow with aqueous sodium carbonate, and evaporated to dryness at 100° C.

The the dyestuff thus obtained, at least one of the duryl residues contains a nuclear sulfo group, $SO_3Na$, in the 4 position on the ring. It dyes wool from either an acid or neutral dyebath in brilliant, pure blue shades of excellent tinctorial strength and fastness properties, being notably fast to light, washing, and fulling. It is of particular value as a neutral dyeing dyestuff, since it posseses a neutral dyeing affinity to wool of about 85% compared with an acid dyeing obtained with a deybath of equal concentration which exhausts completely. In this respect it is considerably superior to the prior art dyestuffs:

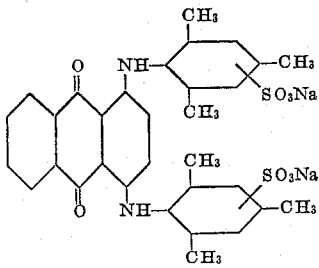

and

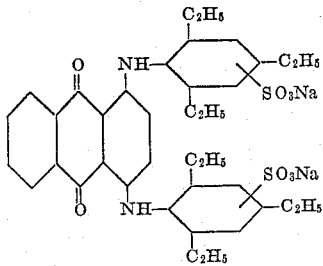

which, according to British Patent 579,519, possess neutral dyeing affinities of only 25% and 50%, respectively.

*Example 2*

A mixture of 36 parts of monobromodurene
18 parts of leuco 1,4-diaminoanthraquinone
17.4 parts of anhydrous potassium acetate
1.5 parts of copper carbonate
40 parts of nitrobenzene is heated with agitation to 185° C. for 12 hours until the condensation is complete. The reaction mixture is allowed to cool overnight, then 200 parts of chlorobenzene are added and the mixture is heated to 120° C. to effect complete solution. The solution is cooled to 20° to 25° C. and filtered, and the filter cake is washed with 80 parts of denatured alcohol formula 2B. The filter cake is slurried in 500 parts of about 2% hydrochloric acid, and the slurry is heated to boiling for ½ hour, and filtered, and the filter cake is washed and dried.

Sulfonation is effected by adding 20 grams of the dyestuff base obtained above to a mixture of 74 parts of 100% sulfuric acid and 38 parts of 26% oleum, and agitating the reaction mixture at 10° to 15° C. until a sample thereof is completely soluble in hot water (1 to 2 hours). The sulfonation mass is drowned in a solution of 265 parts of common salt in about 950 parts of water, and the precipitated dyestuff is separated by filtration, washed acid-free with 22% aqueous sodium chloride solution and then with about 300 parts of 5% aqueous sodium chloride and dried. The water-soluble dyestuff thus obtained is essentially identical with the dyestuff obtained in Example 1.

*Example 3*

A mixture of 11.4 parts of monobromodurene
9.6 parts of 1-methylamino-4-amino-anthraquinone
24 parts of nitrobenzene
9.6 parts of potassium acetate
0.2 part of cuprous chloride
0.2 part of copper carbonate is heated with agitation to 185° C. for 20 hours. The reaction mixture is cooled to 80° C., diluted with 30 parts of denatured alcohol formula 2B, and filtered. The filter cake is digested with about 500 parts of dilute sulfuric acid (about 2%) at the boil, filtered, washed, and dried. The crude product is purified by recrystallization from 3 times its weight of chlorobenzene, and the filter cake of purified product is washed with an equal weight of chlorobenzene and dried.

The dyestuff base thus obtained has the following formula:

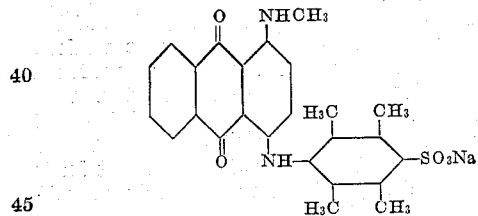

It dissolves in organic solvents to yield bright reddish-blue coloration, and in comparison with the unsulfonated dyestuff prepared in Example 1, it is generally somewhat more soluble in the aforementioned organic solvents.

The dyestuff base is sulfonated by adding 8 parts thereof to 40 parts of 100% sulfuric acid, 40 parts of 26% oleum and 3 parts of sodium sulfate at 10° to 15° C., and agitating the reaction mixture at that temperature until a sample of the mass is completely soluble in water. The sulfonation mass is worked up in the manner described in Example 1. The dyestuff thus obtained has the following formula:

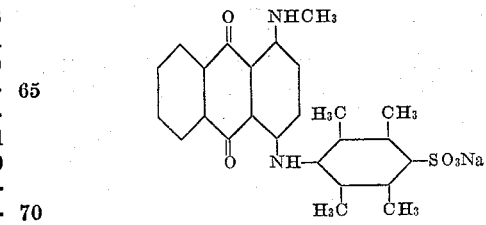

It dyes wool from either an acid or neutral dyebath in string, fast blue shades, which are redder and somewhat duller than those obtained with the sulfonated dyestuff of Example 1.

Example 4

A mixture of 54 parts of monobromodurene
12 parts of 1,4,5,8-tetraaminoanthraquinone
84 parts of nitrobenzene
24 parts of potassium acetate
0.5 part of cuprous chloride
0.5 part of copper carbonate is heated with agitation to 185° to 190° C. for 20 hours. The reaction mixture is cooled to 80° C., diluted with 105 parts of denatured alcohol formula 2B, and filtered, and the filter cake is washed with 50 parts of alcohol 2B. The filter cake is digested with about 500 parts of about 5% sulfuric acid at the boil, filtered, washed and dried. The crude condensation product thus obtained is purified by recrystallization from about 5 times its weight of othodichlorobenzene.

The purified dyestuff base has the following formula:

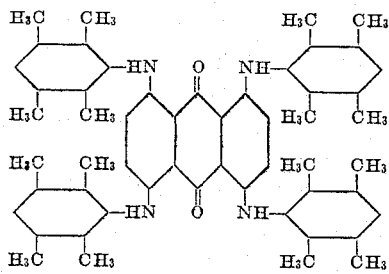

It is practically insoluble in ethyl alcohol, sparingly soluble in acetone and gasoline but appreciably soluble in solvents like nitrobenzene, pyridine and orthodichlorobenzene to yield turquoise colorations. Sulfonation of the dyesuff base with 10 times its weight of 26% oleum at 60° C. yields a water-soluble dyestuff, which may be worked up as described in Example 1 and dyes wool from an acid or neutral bath bluish-green shades. The formula of the water-soluble sulfonated dyestuff is similar to the tetraduryl aminoanthraquinone set forth above with the substitution in at least one, and possibly up to all four of the duryl radicals of a nuclear sulfo group.

While the above describes the preferred embodiments of the invention, it will be understood that departures may be made therefrom within the scope of the specification and claims.

What is claimed is:

1. As new compositions of matter, the anthraquinone dyestuffs having the following general formula:

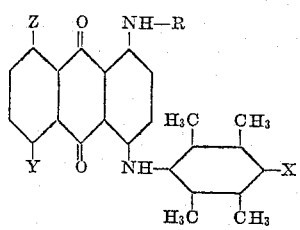

wherein R represents a member selected from the group consisting of hydrogen, alkyl and the radical

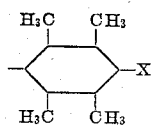

each X represents a member selected from the group consisting of hydrogen and a sulfo group, and Y and Z each represent a member selected from the group consisting of hydrogen and NH—R wherein R has the same significance as above.

2. As new compositions of matter, the anthraquinone dyestuffs having the formula:

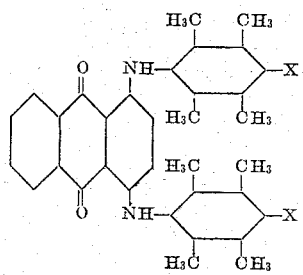

wherein each X is a member selected from the group consisting of hydrogen and a sulfo group.

3. As new compositions of matter, the anthraquinone dyestuffs having the formula:

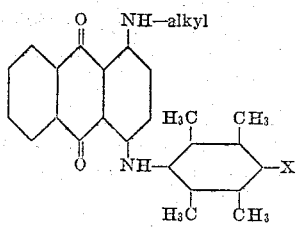

wherein X is a member selected from the group consisting of hydrogen and a sulfo group.

4. As new compositions of matter, the anthraquinone dyestuffs having the formula:

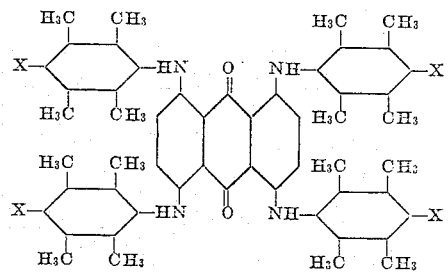

wherein each X is a member selected from the group consisting of hydrogen and a sulfo radical.

5. In a process for preparing new anthraquinone dyestuffs having the following general formula:

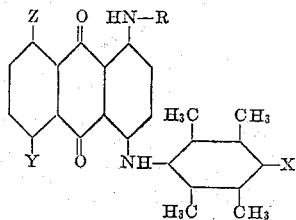

wherein R represents a member selected from the group consisting of hydrogen, alkyl and the radical

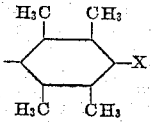

each X represents a member selected from the group consisting of hydrogen and a sulfo group, and Y and Z each represent a member selected from the group consisting of hydrogen and NH—R wherein R has the significance indicated above, the step which comprises heating a mixture of an anthraquinone compound having the formula

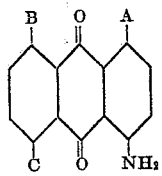

wherein A represents a member selected from the group consisting of amino and alkylamino radicals, and B and C each represent a member selected from the group consisting of hydrogen, amino and alkylamino radicals, and 3-halo-1,2,4,5-tetramethyl-benzene, to a temperature between about 100° C. and about 250° C. in a liquid diluent and in the presence of a catalyst.

6. The process of claim 5 wherein the resulting product is treated with a sulfonating agent.

7. The process according to claim 5 wherein the liquid diluent is a nitrated aromatic hydrocarbon, and wherein the catalyst is a copper-containing material.

8. In a process for preparing new anthraquinone dyestuffs of the formula:

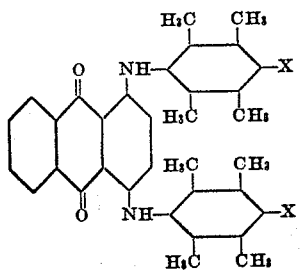

wherein X represents a member selected from the group consisting of hydrogen and a sulfo group, the step which comprises heating a mixture containing about two mols of 1,2,4,5-tetramethyl-3-bromobenzene and about one mol of 1,4-diamino anthraquinone in a nitrobenzene solution at a temperature between about 180° C. and about 190° C. for a period of between about 5 hours and about 15 hours, in the presence of a copper-containing catalyst and an acid-binding agent.

9. In a process for preparing new anthraquinone dyestuffs of the formula:

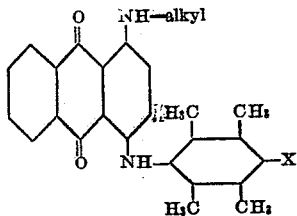

wherein X represents a member selected from the group consisting of hydrogen and a sulfo group, the step which comprises heating a mixture containing between about 1 and about 2 molecular proportions of 1,2,4,5-tetramethyl-3-bromobenzene per mol of a 1-amino-4-alkyl-amino-anthraquinone in a nitrobenzene solution at a temperature between about 180° C. and about 190° C. for a period between about 5 hours and about 20 hours in the presence of a copper-containing catalyst and an acid-binding agent.

10. In a process for preparing new anthraquinone dyestuffs of the formula:

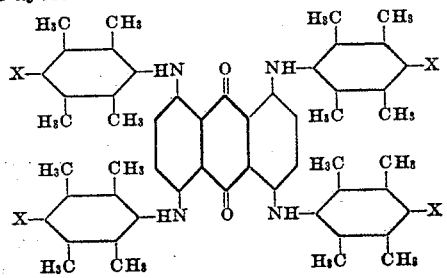

wherein X represents a member selected from the group consisting of hydrogen and a sulfo group, the step which comprises heating a mixture containing at least about four mols of 1,2,4,5-tetramethyl-3-bromobenzene and about one mol of 1,4,5,8-tetraaminoanthraquinone dissolved in nitrobenezne, to a temperature between about 180° C. and about 190° C. for between about 5 and about 20 hours in the presence of a copper-containing catalyst and an acid binding agent.

11. The composition of claim 1 wherein each X is hydrogen.

12. The composition of claim 1 wherein at least one X is a sulfo group.

JAMES OGILVIE.

REFERENCES CITED

The following references are of record in the file of this patent:

UNITED STATES PATENTS

| Number | Name | Date |
| --- | --- | --- |
| 2,253,828 | von Allmen et al. | Aug. 26, 1941 |

FOREIGN PATENTS

| Number | Country | Date |
| --- | --- | --- |
| 579,519 | Great Britain | Aug. 7, 1946 |